May 6, 1947.  C. D. WEST  2,420,273
ACHROMATIC SIGHT FOR GUNS, CAMERAS OR THE LIKE, INCLUDING POLARIZING
AND BIREFRINGENT ELEMENTS
Filed Sept. 18, 1944

Patented May 6, 1947

2,420,273

UNITED STATES PATENT OFFICE 2,420,273

ACHROMATIC SIGHT FOR GUNS, CAMERAS, OR THE LIKE, INCLUDING POLARIZING AND BIREFRINGENT ELEMENTS

Cutler D. West, Cambridge, Mass., assignor to Polaroid Corporation, Cambridge, Mass., a corporation of Delaware Application September 18, 1944, Serial No. 554,590

5 Claims. (Cl. 88—65)

This invention relates to a new and improved sight for use in conjunction with firearms, cameras, or the like.

There has recently been developed a new sight of the above class, which comprises a birefringent element mounted between light-polarizing elements in such manner as to provide an interference pattern at optical infinity, which pattern constitutes the reticle of the sight. However, the birefringent elements used heretofore as the central elements in said sights are of substantially uniform birefringence and this gives rise to problems of chromatic dispersion. It is an object of the present invention to overcome these problems and more specifically to provide a sight of the above indicated type wherein the birefringent central layer is substantially achromatic for visible light.

Figure 1:
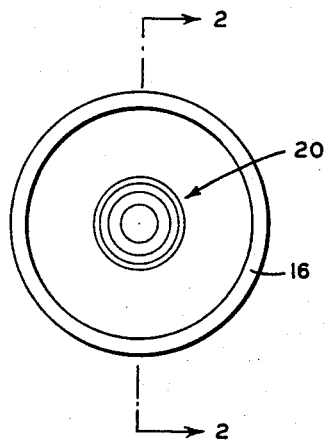
Figure 2:
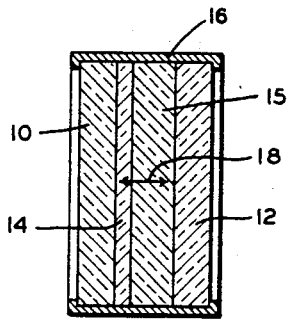

Other objects and advantages of the present invention will in part appear and in part be pointed out in the course of the following detailed description of one or more embodiments of the invention, which are given as non-limiting examples, in connection with the accompanying drawings, in which:

Figure 1 is an elevation showing an embodiment of the invention and illustrating diagrammatically the interference pattern produced when circular polarizers are employed of the character adapted to transmit light circularly polarized by each other; and Figure 2 is a section on the line 2—2 in Fig. 1.

In the drawings elements 10 and 12 comprise light-polarizing material, and from the standpoint of the present invention it is immaterial whether they be linear or circular polarizers and what their relation to each other may be. In the specific embodiment of the invention illustrated, however, polarizers 10 and 12 are to be understood as being circularly polarizing elements of the type adapted to transmit light circularly polarized by each other. It will of course be understood that in this case each of said polarizers may comprise a plane polarizing element and a quarter-wave retardation element positioned between its associated polarizing element and the other polarizing element with its vibration directions at angles of substantially 45° to the axis of its associated polarizing element. In the embodiments of this device which have previously been made there is generally employed a basal section of a uniaxial crystal, such as calcite or sodium nitrate, mounted between polarizers 10 and 12 in the position occupied by elements 14 and 15 in Fig. 2. The entire assembly may be bonded together by any suitable adhesive means, but for simplicity specific showing thereof is omitted from the drawing. Element 16 represents any suitable mounting rim for the sight. Arrow 18 represents the optic axis of the birefringent material between polarizers 10 and 12.

Fig. 1 illustrates the interference pattern visible to an observer looking along axis 18 of the birefringent element in the combination shown in Fig. 2. As indicated, said pattern comprises a series of concentric rings 20, and when the device is utilized as a sight said pattern serves as the reticle, with the center thereof overlying the point in the field from which light passes directly to the eye of the observer along axis 18. However, when the device is utilized in ordinary light, chromatic dispersion within the birefringent layer causes rings 20 to appear in the sequence of interference colors, with the result that they are not as sharp as would be desirable. If, on the other hand, the device is utilized in monochromatic light, as by interposing a suitable filter in the line of sight, this causes rings 20 to be sharp and black but has the further effect of greatly diminishing the total amount of light transmitted by the device and hence the illumination of the field.

In accordance with the present invention the above difficulty is obviated by substituting for a single birefringent element a combination of two or more such elements 14 and 15, comprising different materials of different birefringence and so chosen and combined as to be achromatic in white light. In other words, it is the object of the present invention to provide a sight of the type illustrated in the drawings wherein rings 20 will appear sharp and substantially black when the device is used in white light.

In selecting and combining birefringent elements for use, for example, in the embodiment of the invention illustrated in Fig. 2, one of the most important considerations is the spectral dispersion of birefringence in the materials available for the purpose, that is to say, the extent to which birefringence varies with wavelength. A convenient scale for computing this value, which will be designated as N, is in accordance with the equation $$N = \frac{\Gamma(D)}{\Gamma(F) - \Gamma(C)} \qquad (1)$$

wherein $\Gamma(D)$ is the retardation or path difference between the ordinary and extraordinary ray, measured in units of length, of a given birefringent material of given thickness for the sodium or D line of the spectrum, and $\Gamma(F)$ and $\Gamma(C)$ represent similar values for the F and C lines of the spectrum, respectively. For most birefringent materials $\Gamma$ is substantially constant throughout the visible spectrum, and N may range from infinity to minus infinity, although for most commonly available materials its absolute value is usually of the order of 20 or more. For the purposes of the present invention it is desired to obtain birefringent material wherein $\Gamma$ is not constant throughout the visible spectrum, but preferably varies in such manner as to be substantially directly proportional to wavelength, in which case it will be seen that the phase difference ($\delta$) introduced by the passage of polarized light through the material will be constant with wavelength. The following relations are also useful in considering this subject:

$$\Gamma = \delta\lambda/2\pi = \Delta n(\lambda) \cdot t \qquad (2)$$

wherein thickness ($t$) and wavelength ($\lambda$) are expressed in the same units as $\Gamma$, and $\Delta n(\lambda)$ is the difference between the refractive indices for a given wavelength. The value for N necessary for achromatism may be readily derived from Equations 1 and 2 as follows:

$$N = \frac{\delta\lambda(D)/2\pi}{\delta\lambda(F)/2 - \delta\lambda(C)/2} \qquad (3)$$

but since the N for achromatism is the N for constant $\delta$, the constant term $\delta/2\pi$ cancels out, and $$N = \frac{\lambda(D)}{\lambda(F) - \lambda(C)} = \frac{589}{486 - 656} = \frac{589}{-170} = -3.46 \qquad (4)$$

which may for convenience of computation be considered as $-3.50$.

As already indicated, material having an N value of the desired order is not readily found in nature. Calcite, for example, which has been the material most generally used in sights of the type with which the present invention is concerned, has an N value of 23.68. In accordance with the invention, therefore, it is necessary to combine different birefringent materials in such manner that the N value of the combination approaches the necessary conditions for achromatism. In any such combination of birefringent elements, the dispersion of birefringence for the combination will be found to be governed by the formula $$N = \frac{N_1 \cdot N_2 (\Gamma_1 \pm \Gamma_2)}{N_2 \cdot \Gamma_1 \pm N_1 \cdot \Gamma_2} \qquad (5)$$

wherein $N_1$ and $N_2$ represent the N values respectively of the individual components of the combination, and $\Gamma_1$ and $\Gamma_2$ represent the path differences in the two materials for a given wavelength, which should preferably be near the middle of the portion of the spectrum for which achromatism is desired and may conveniently be the D line. Since, however, the desired N for the combination is already determined as $-3.50$, and since for a given birefringence, $\Gamma$ varies according to thickness, as appears from Equation 2, it will in general be preferable to substitute the corresponding values in Equation 5, as follows:

$$-3.50 = \frac{N_1 N_2 (\Delta n_1 \cdot t_1 \pm \Delta n_2 \cdot t_2)}{N_2 (\Delta n_1 \cdot t_1) \pm N_1 (\Delta n_2 \cdot t_2)} \qquad (6)$$

It will be understood that since the present invention is concerned primarily with basal sections, the choice of whether the positive and negative signs in Equations 5 and 6 are used depends upon whether the components of the combination are of the same or opposite signs of birefringence.

In practicing the invention a simple procedure is first to select a birefringent element of a particular material and thickness suitable for use in a sight of the type described but wherein N is not sufficiently near the optimum for achromatism. The next step is to choose another birefringent material to combine with the first, and in making this selection the N value of the second material is a controlling factor. Two general rules may be stated in this connection. The first is that it is essential that the two materials have different N values. This is readily demonstrated by solving Equation 5 for the case wherein $N_2$ is equal to $N_1$, as follows:

$$N = \frac{N_1 \cdot N_1 (\Gamma_1 \pm \Gamma_2)}{N_1 \Gamma_1 \pm N_1 \Gamma_2} = N_1 \qquad (7)$$

Or in other words, when materials having the same dispersion of birefringence are combined, the dispersion of birefringence in the combination will equal the dispersion of birefringence in any of the component elements.

The second rule is that the greater the difference between $N_1$ and $N_2$, the less will be the thickness which is needed in the second element to achromatize the combination. This rule, however, is subject to one reservation. As was already pointed out, in most commonly available birefringent materials the absolute value of N is of the order of 20 or substantially higher. In fact, birefringent materials having an N value of less than 20 may be considered as abnormal. The second rule, therefore, should be modified to include the statement that achromatic combinations of the least thickness are obtained when one element is chosen from the class having abnormally low N values. It should be expressly understood, however, that this rule applies only to the thickness of the combination and is not otherwise limiting to the invention.

Referring again to the drawings, it should be pointed out that since the pattern defined by rings 20 is at infinity, by definition the angular sizes of said rings are constant. Furthermore, said sizes are determined by the thickness and birefringence of the birefringent material between polarizers 10 and 12, and the sizes of adjacent rings bear fixed relations to each other, increasing in the case of uniaxial material in accordance with the progression $\sqrt{1}, \sqrt{3}, \sqrt{5}, \sqrt{7} \ldots \sqrt{2n-1}$, starting with the innermost ring. It is preferable therefore to control the birefringent element in the sight in such manner as to give an innermost ring of a convenient angular size.

A convenient specific example of an embodiment of the invention is a sight of the type shown in the drawings wherein a basal section of calcite 14 approximately 1.50 mm. in thickness is mounted between like circular polarizers 10 and 12. In this case the radius of the innermost ring 20 in Fig. 1 will be a chord subtending an angle of 50 mils, but said ring will appear colored in ordinary light.

In accordance with the present invention, rings 20 may be achromatized by combining with element 14 a basal section 15 of some uniaxial birefringent material having an N value different, and preferably substantially different, from that of calcite. Calcite has a negative birefringence ($\Delta n_1$) of 0.1721 for the D line and an N value of 23.68. Among the many materials suitable for combination with calcite for the purposes of this invention, an example is potassium periodate ($KIO_4$) which has a positive birefringence ($\Delta n_2$) of 0.0274 for the D line and an N value of 6.85. To find the desired thickness for a basal section 15 thereof in this example, it is necessary first to substitute the above values of $N_1$, $N_2$, $\Delta n_1$, $\Delta n_2$ and $t_1$ in Equation 6 and solve for $t_2$, using the negative signs since calcite and potassium periodate are of opposite signs of birefringence. It will be found that $t_2$ should equal 7.16 mm. However, the combined retardation $(\Gamma_1-\Gamma_2)$ of the calcite layer $(\Gamma_1=\Delta n_1 \cdot t_1 = 0.2591$ mm.) and the potassium periodate layer $(\Gamma_2=\Delta n_2 \cdot t_2 = 0.1963$ mm.) is only 0.0618 mm., i. e., approximately one-quarter the retardation of the calcite layer alone, so that the thickness of the combination should be increased by a factor of approximately 4 to give the substantially same retardation.

It follows from the above example that if layer 14 in Fig. 2 is a basal section of calcite 6.00 mm. in thickness and layer 15 is a basal section of potassium periodate approximately 28.65 mm. in thickness, and if layers 10 and 12 are like circular polarizers, the innermost of rings 20 in Fig. 1 will have a radius of approximately 50 mils and will be substantially black in ordinary light. It should be understood that the degree of achromatism in this combination will be highest for the innermost ring, and will gradually decrease for the rings further from the center. This results primarily from the fact that the rays which it is desired to achromatize travel through the system obliquely, and the above outlined calculations do not take this factor into account. Furthermore, the above equations are based on retardations at only three wavelengths, and they are therefore only approximations. On the other hand, these approximations have in practice proved to be substantially reliable. Furthermore, when achromatization of the innermost ring is accomplished, the rings adjacent thereto will also approach achromatism, and for most uses this will be quite sufficient since in practice only the rings near the center of the pattern need be used.

It will of course be apparent that it is immaterial from the standpoint of the invention whether all these elements be bonded together or merely assembled in superimposed relation as shown in Fig. 2. For practical use, however, they should be bonded together and any adhesive materials are suitable for this purpose, including for example a plasticized, polymerized, incomplete vinyl acetal resin or a polymerized ester of acrylic or methacrylic acid such as butyl methacrylate. It should also be pointed out that when the present invention is practiced with circular polarizers 10 and 12 as mentioned above, the achromatism of the system will be highest when the quarter-wave elements are arranged with their corresponding vibration directions at right angles to each other. If then the linear polarizers have their axes parallel, rings 20 will appear as in Fig. 1, and if said axes are crossed, the pattern will be similar but will have a black dot in the center thereof.

It should be expressly understood that the present invention is capable of wide variation in so far as the possible materials and combinations of materials are concerned. For example, it is in no way essential that birefringent crystals be used but on the contrary, any other material optically equivalent to a uniaxial crystal may also be used, and examples of such other materials include suitably oriented plastics such as the polyamides, or films of organic material such as isophthalic acid evaporated onto a transparent support under high vacuum. It is not essential that the two layers comprise materials of the same general class, nor is it essential that only two birefringent layers be used although the latter is preferred from the standpoint of simplicity. It is however quite possible to utilize more than two layers, although in this case the elements should be assembled in pairs so that the final computation may be based on a pair of layers, one or both of which may individually comprise two or more components.

Since certain changes may be made in the above article and different embodiments of the invention could be made without departing from the scope thereof, it is intended that all matter contained in the above description or shown in the accompanying drawings shall be interpreted as illustrative and not in a limiting sense.

What is claimed is:

1. As a new article of manufacture, the combination comprising a pair of light-polarizing elements positioned in superimposed and parallel relation, and uniaxial birefringent means positioned between said polarizing elements and having the surfaces thereof adjacent said polarizing elements substantially parallel and each substantially perpendicular to the optic axis therein, said birefringent means comprising a first birefringent element and a second birefringent element each comprising different material and positioned in superimposed relation with their optic axes parallel, the dispersion (N) of birefringence in said combination of birefringent elements being of the order of −3.46 as expressed by the formula $$N=\frac{N_1 N_2 (t_1 \Delta n_1 \pm t_2 \Delta n_2)}{N_2(t_1 \Delta n_1) \pm N_1(t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said ± being + when the birefringent elements have the same sign of birefringence and − when the birefringent elements have opposite signs of birefringence, and $N_1$ and $N_2$ represent the dispersion (N) of birefringence in said first and second birefringent elements respectively, as expressed by the formula $$N=\frac{\Gamma(D)}{\Gamma(F)-\Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$; said combination of birefringent elements being of such thickness and birefringence as to produce an interference pattern at optical infinity visible to an observer looking through said article, said birefringent and polarizing elements producing a central interference indicium appearing concentric with said optic axis at optical infinity, said elements also producing a predetermined series of other indicia appearing at optical infinity and being predeterminedly angularly related to said optic axis, wherein the relationship $(\Delta n_1 t_1 \pm \Delta n_2 t_2)$ is such as to give the desired angular relationships between the indicia of said pattern.

2. As a new article of manufacture, the combination comprising a pair of light-polarizing elements positioned in superimposed and parallel relation, and uniaxial birefringent means positioned between said polarizing elements and having the surfaces thereof adjacent said polarizing elements substantially parallel and each substantially perpendicular to the optic axis therein, said birefringent means comprising a first birefringent element and a second birefringent element each comprising different material of opposite signs of birefringence and positioned in superimposed relation with their optic axis substantially parallel, the dispersion (N) of birefringence in said combination being of the order of −3.46 as expressed by the formula $$N = \frac{N_1 N_2 (t_1 \Delta n_1 - t_2 \Delta n_2)}{N_2 (t_1 \Delta n_1) - N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of each of said combined birefringent elements, respectively, for the D line of the spectrum and $\Gamma(F)$ and $\Gamma(C)$ represent similar values for the F and C lines of the spectrum, respectively, $N_1$ being substantially different from $N_2$; said combination of birefringent elements being of such thickness and birefringence as to produce an interference pattern at optical infinity visible to an observer looking through said article, said birefringent and polarizing elements producing a central interference indicium appearing concentric with said optic axis at optical infinity, said elements also producing a predetermined series of other indicia appearing at optical infinity and being predeterminedly angularly related to said optic axis, wherein the relationship ($\Delta n_1 t_1 - \Delta n_2 t_2$) is such as to give the desired angular relationships between the indicia of said pattern.

3. As a new article of manufacture, the combination comprising a pair of light-polarizing elements positioned in superimposed and parallel relation, and uniaxial birefringent means positioned between said polarizing elements and having the surfaces thereof adjacent said polarizing elements substantially parallel and each substantially perpendicular to the optic axis therein, said birefringent means comprising a substantially basal section of calcite and a substantially basal section of potassium periodate positioned in superimposed relation, the dispersion (N) of birefringence of said combination of birefringent elements being of the order of −3.46 as expressed by the formula $$N = \frac{N_1 N_2 (t_1 \Delta n_1 - t_2 \Delta n_2)}{N_2 (t_1 \Delta n_1) - N_1 (t_2 \Delta n_2)}$$

wherein $t_1$ and $t_2$ represent the thickness of said calcite and potassium periodate layer, respectively, $\Delta n_1$ and $\Delta n_2$ represent the differences between the refractive indices of said calcite and potassium periodate layers, respectively, and $N_1$ and $N_2$ represent the dispersion (N) of birefringence in said calcite and potassium periodate layers, respectively, as expressed by the formula $$N = \frac{\Gamma(D)}{\Gamma(F) - \Gamma(C)}$$

wherein $\Gamma(D)$ represents the path difference of each of said calcite and potassium periodate layers, respectively, for the D line of the spectrum and $\Gamma(F)$ and $\Gamma(C)$ represent similar values for the F and C lines of the spectrum, respectively, said combination of birefringent elements being of such thickness and birefringence as to produce an interference pattern at optical infinity visible to an observer looking through said article.

4. As a new article of manufacture, the combination comprising a pair of light-polarizing elements positioned in superimposed and parallel relation, and uniaxial birefringent means positioned between said polarizing elements and having the surfaces thereof adjacent said polarizing elements substantially parallel and each substantially perpendicular to the optic axis therein, said birefringent means comprising a first birefringent element and a second birefringent element, each comprising different material and positioned in superimposed relation with their optic axes parallel, the dispersion (N) of birefringence in said combination of birefringent elements being of the order of −3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said $\pm$ being $+$ when the birefringent elements have the same sign of birefringence and $-$ when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, said combination of birefringent elements being of such thickness and birefringence as to produce an interference pattern at optical infinity visible to an observer looking through said article, said birefringent and polarizing elements producing a central interference indicium appearing concentric with said optic axis at optical infinity, said elements also producing a predetermined series of other indicia appearing at optical infinity and being predeterminedly angularly related to said optic axis, wherein the relationship ($\Delta n_1 t_1 \pm \Delta n_2 t_2$) is such as to give the desired angular relationships between the indicia of said pattern, at least one of said birefringent elements being a suitably oriented plastic polyamide which has optical characteristics similar to a uniaxial birefringent crystal.

5. As a new article of manufacture, the combination comprising a pair of light-polarizing elements positioned in superimposed and parallel relation, and uniaxial birefringent means positioned between said polarizing elements and having the surfaces thereof adjacent said polarizing elements substantially parallel and each substantially perpendicular to the optic axis therein, said birefringent means comprising a first birefringent element and a second birefringent element, each comprising different material and positioned in superimposed relation with their optic axes parallel, the dispersion (N) of birefringence in said combination of birefringent elements being of the order of —3.46 as expressed by the formula $$N = \frac{N_1 N_2 (t_1 \Delta n_1 \pm t_2 \Delta n_2)}{N_2 (t_1 \Delta n_1) \pm N_1 (t_2 \Delta n_2)}$$

wherein $t_1$ and $t_2$ represent the thicknesses of said first and second birefringent elements respectively, $\Delta n_1$ and $\Delta n_2$ represent the differences between the refractive indices of said first and second birefringent elements respectively, said $\pm$ being $+$ when the birefringent elements have the same sign of birefringence and $-$ when the birefringent elements have opposite signs of birefringence, and $N_1$ and $N_2$ represent the dispersion (N) of birefringence in said first and second birefringent elements respectively, as expressed by the formula $$N = \frac{\Gamma(D)}{\Gamma(F) - \Gamma(C)}$$

wherein $\Gamma(D)$ represents the path difference of said combination of birefringent elements for the D line of the spectrum and $\Gamma(F)$ and $\Gamma(C)$ represent similar values for the F and C lines of the spectrum, respectively, $N_1$ being substantially different from $N_2$, said combination of birefringent elements being of such thickness and birefringence as to produce an interference pattern at optical infinity visible to an observer looking through said article, said birefringent and polarizing elements producing a central interference indicium appearing concentric with said optic axis at optical infinity, said elements also producing a predetermined series of other indicia appearing at optical infinity and being predeterminedly angularly related to said optic axis, wherein the relationship $(\Delta n_1 t_1 \pm \Delta n_2 t_2)$ is such as to give the desired angular relationships between the indicia of said pattern, at least one of said birefringent elements being a film of isophthalic acid and having optical characteristics similar to a uniaxial birefringent crystal.

CUTLER D. WEST.

REFERENCES CITED

The following references are of record in the file of this patent:

UNITED STATES PATENTS

| Number | Name | Date |
| --- | --- | --- |
| 1,926,716 | Ehringhaus | Sept. 12, 1933 |

FOREIGN PATENTS

| Number | Country | Date |
| --- | --- | --- |
| 378,742 | Great Britain | Aug. 13, 1932 |

OTHER REFERENCES

Wright Text on Light, 1892, publ. MacMillan & Co., pages 339–342, 360, and 361–365, plate 7 opposite page 356 and plate 8 opposite page 360.